Feb. 23, 1960    R. TRUELL ET AL    2,926,261
ULTRASONIC NEUTRON DOSIMETER
Filed Feb. 27, 1959    2 Sheets-Sheet 1

INVENTORS
ROHN TRUELL
JOHN de KLERK
PAUL W. LEVY
BY

INVENTORS
ROHN TRUELL
JOHN de KLERK
PAUL W. LEVY
BY

United States Patent Office 2,926,261
Patented Feb. 23, 1960

2,926,261

ULTRASONIC NEUTRON DOSIMETER

Rohn Truell and John de Klerk, Providence, R.I., and Paul W. Levy, Sayville, N.Y., assignors to the United States of America as represented by the United States Atomic Energy Commission Application February 27, 1959, Serial No. 796,186

15 Claims. (Cl. 250—83.1)

This invention relates to neutron dosimetry, and more particularly it relates to method and apparatus whereby ultrasonic-wave pulses are established in a medium responding to neutron flux, and a remote indication of ultrasonic wave transmission characteristic in the medium provides a measure of the neutron dose received thereby.

It is often desirable that the integrated neutron flux or dose over a period at a location in a neutron flux as, for example, in a neutron reactor be determined continuously in situ. Information concerning neutron dose as such may be determined by placing a neutron-responsive medium as, for example, indium foil, in a neutron flux and removing it after irradiation to a remote location for measurement of neutron-dose indicative physical or chemical characteristics. This is generally disadvantageous, for either a series of measurements must be made on a plurality of irradiated media, each having been in the neutron flux for a respective period, or repetitive measurements must be made on the same medium after successive irradiations. It is difficult to obtain through these procedures consistently meaningful determinations of neutron dose as there are the critical requirements of reproducibility of such variables as chemical composition, physical dimensions, and relocation in the neutron flux. Further, a medium irradiated by neutron flux usually becomes radioactive and the attendant precautions requisite for protection of personnel often make the neutron-dose determining measurements much more complex than they are in the absence of radioactivity.

In the practice of this invention, a determination of the neutron dose received by a neutron-responsive medium while in situ is ascertained through monitoring of an ultrasonic-wave transmission characteristic change during the irradiation of the medium. The medium, as, for example, borosilicate-glass, is affixed as by a bonding cement or otherwise ultrasonically coupled as, by a suitable liquid, to a transducer which is, in turn, remotely coupled electrically to a radiofrequency electrical wave pulse generator and receiver. The medium is placed in the neutron flux, and remote measurements of the change of an ultrasonic-wave transmission characteristic as, for example, attenuation or velocity, are made during the irradiation. There is correlation between the change in the characteristics of the radiofrequency electrical pulses transmitted to and received from the transducer by the radiofrequency electrical generator and receiver, respectively, and the change in transmission characteristic of the ultrasonic-wave pulses induced in the medium by the transducer during neutron irradiation thereof.

The neutron responsive medium or sensitive material can conveniently be made of numerous materials, especially those containing boron or lithium, such as borosilicate-glass or lithium-containing glass or lithium fluoride, and, with an associated transducer, can conveniently have dimensions which will permit these elements to be inserted into an irradiation channel of a neutron reactor.

Accordingly, it is an object of this invention to provide method and apparatus for neutron dosimetry utilizing ultrasonic wave pulses.

It is another object of this invention to provide method and apparatus for ultrasonic neutron dosimetry utilizing ultrasonic-wave pulses for obtaining determination of neutron dose at a particular location in a neutron flux through measurement of the change of an ultrasonic-wave transmission characteristic of a medium during neutron irradiation thereof.

It is an additional object of this invention to provide method and apparatus for ultrasonic neutron dosimetry whereby ultrasonic-wave pulses are established in a neutron-responsive medium at a particular location in a neutron flux whose ultrasonic wave attenuation characteristic is affected by the neutron-dose received thereby and coupling an electrical indication of the affected ultrasonic-waves to a remotely located means for ascertaining said attenuation.

It is a second additional object of this invention to provide method and apparatus for ultrasonic neutron dosimetry whereby ultrasonic-wave pulses are established in a neutron-responsive medium at a particular location in a neutron flux whose ultrasonic-wave velocity characteristic is affected by the neutron-dose received thereby and coupling an electrical indication of the affected ultrasonic waves to a remotely located means for ascertaining said velocity change.

It is a third additional object of this invention to provide method and apparatus for ultrasonic neutron dosimetry for slow neutron-dose incorporating a glass medium having $_5B^{10}$ (boron-10) therein whereby $B^{10}$ $(n,\alpha)$ $Li^7$ reactions affect the ultrasonic wave attenuation therein, a transducer ultrasonically coupled to said medium and remotely electrically coupled to a radiofrequency electrical wave pulse generator and receiver whereby echo ultrasonic-wave pulses established in said medium by said transducer cause said transducer to initiate electrical wave pulses which at said receiver provide a measure of said dose.

It is a fourth additional object of this invention to provide method and apparatus for ultrasonic neutron dosimetry for slow neutron dose incorporating a glass medium having $_5B^{10}$ therein whereby $B^{10}$-$(n,\alpha)$ $Li^7$ reactions affect the ultrasonic wave velocity thereof, a transducer ultrasonically coupled to said medium and remotely electrically coupled to a radiofrequency electrical wave pulse generator and receiver whereby echo ultrasonic-waves established in said medium by said transducer cause said transducer to initiate electrical wave pulses which at said receiver provide a measure of said dose.

It is a fifth additional object of this invention to provide method and apparatus for ascertaining neutron irradiation effects in borosilicate-glass through ultrasonic-wave transmission characteristic measurements made while the borosilicate-glass is being irradiated by neutrons.

Other additional objects and advantages of this invention will be recognized and understood through consideration of the following discussion and drawings of which:

Certain media, when exposed to neutron flux, undergo changes in physical characteristics caused by neutron damage therein. In borosilicate-glass the damage results from alpha-particle and lithium-particle recoils which occur in a reaction $B^{10}(n,\alpha)Li^7$. The magnitude of the damage is quantitatively related to the neutron-dose received by the medium and is manifested by a concomitant change in the vibrational (ultrasonic wave) energy transmission characteristic of the material, particularly the attenuability of ultrasonic vibrations and the alteration of the velocity of such vibrations. Both the change in velocity and the attenuation of the ultrasonic vibrations are measures of the total neutron flux or neutron-dose received over a period by the medium.

A theoretical explanation of the phenomena which occur in the operation of this invention as applied to borosilicate-glass postulates capture of a thermal neutron by the nucleus of an atomic species which is capable of undergoing a recoil reaction similar to fission without generation of additional neutrons. The recoil particles are sufficiently energetic to disrupt the normal lattice structure of the atoms of the solid as they leave the site of the fission. This distortion of the lattice structure causes microscopic and macroscopic mechanical changes which can be measured by changes in ultrasonic transmission characteristics of the sensitive substance.

An embodiment of this invention comprises a block of sensitive substance containing $_5B^{10}$ (boron-10) subject to damage from alpha-particle and lithium-particle recoils acting in concord with a means for generating ultrasonic-wave pulses and with either a means for remotely measuring the attenuation of the ultrasonic vibrations caused by their passage through the block of sensitive material or with a means for remotely measuring the velocity change of the ultrasonic pulses through the block of sensitive material over a period.

One pulse of ultrasonic energy into the medium results in a series of successive return signal pulses, each having less energy than a prior return signal pulse. The attenuation is measurable by conventional attenuation measuring means which, in effect, solves the conventional attenuation equation for the attenuation constant $\alpha$, $$H = H_0 e^{-\alpha t}$$

where H refers to the height, or energy content, of a return signal pulse at time $t$, $H_0$ is a constant for the particular system, $e$ is the base of the Napierian logarithm and $\alpha$ is a constant which describes the attenuation. The signal pulses are separated in time by an interval which is determined by the dimensions of the medium and the velocity for transmission of vibrational energy therein. For a medium of known dimensions, the interval between return signal pulses is inversely proportional to the velocity of wave transmission through the solid.

Figure 1:
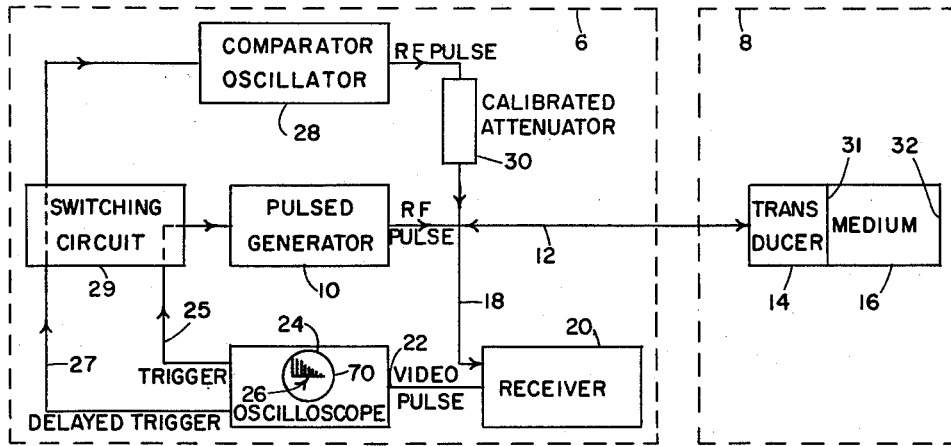
Figure 1 is a block diagram of the ultrasonic neutron dosemetry system showing apparatus for generating and receiving radiofrequency electrical wave pulses electrically coupled to a transducer which is, in turn, ultrasonically coupled to a neutron-responsive medium, and an oscilloscope for displaying information relative to ultrasonic-wave attenuation or velocity in the medium.

Figure 1 shows a block diagram of a radiofrequency electrical pulse generating and receiving system remotely coupled electrically to a transducer which is ultrasonically coupled to a neutron-responsive medium and is suitable for the practice of this invention. The radiofrequency portion of the system is indicated by dashed box 6. Radiofrequency electrical wave pulse generator 10 is remotely connected electrically via electrical cable 12 to transducer 14 which is, in turn, ultrasonically coupled to neutron-responsive medium 16. Transducer 14 and medium 16 are located in a neutron flux environment represented by the area within dashed box 8. Transducer 14 establishes ultrasonic waves in medium 16 and in turn electrical waves are generated by transducer 14 as the result of ultrasonic echo waves in medium 16. These electrical waves are transmitted via electrical cable 12 and electrical cable 18 to receiver 20 which is in turn connected via electrical cable 22 to oscilloscope 24. Oscilloscope 24 displays pattern 26 (shown in greater detail in Figure 3) representative of information concerning the neutron-dose received by medium 16 in neutron flux environment 8.

Oscilloscope 24 triggers pulse generator 10 via electrical cable 25 and switching circuit 26 so that radiofrequency pulses are generated by pulse generator 10 at frequent intervals, all as described in greater detail hereinafter. Oscilloscope 24 is also connected via electrical cable 27 and switching circuit 29 to comparator oscillator 28. Comparator oscillator 28 provides a radiofrequency pulse via calibrated attenuator 30 and electrical cable 18 to receiver 20 which assists in determining the neutron-dose received by medium 16.

In greater detail, the operation of the system shown in Figure 1 will now be considered. A trigger pulse from the oscilloscope 24 (about 300 pulses per second) triggers the pulsed generator 10. The generator 10 produces a 1 to 4 microsecond wide pulse of radiofrequency energy between 5 and 200 megacycles. This high frequency electrical energy is applied to a piezo-electric quartz crystal transducer 14 which converts the electrical oscillations into mechanical vibrations of ultrasonic-wave pulses. These ultrasonic waves pass into the neutron-responsive medium 16 and are returned to the transducer 14 by reflection from the far end 32 of the medium and reconverted to electrical signals by the transducer 14. By the time the return signal has arrived thereto, the generator 10 is off. The return signals enter the input of sensitive receiver 20 which presents an amplified video pulse on line 22 to the vertical plates of the oscilloscope 24, the horizontal sweep of which was initiated by the aforesaid trigger pulse. There will, in general be many reflected echoes arising from an ultrasonic pulse generated by transducer 14 in medium 16. It is reflected back and forth by the ends 31 and 32 in the medium 16, and many vertical trace heights will appear on the oscilloscope 24 as pattern 26. The next trigger pulse from oscilloscope 24 causes the process to be repeated.

The time between successive generator 10 pulses is about 3,000 microseconds, and the transit time for one round trip in the sound medium 16 is approximately 5 to 50 microseconds. There are no standing waves in the sound medium 16 under proper operating conditions. A crystal calibrated time delay is available on the oscilloscope 24 which makes it possible to pick out 4, 10 and 25 microsecond sections of the full oscilloscope sweep at any time delay up to 100 microseconds. The delay trigger can be initiated at any time to 100 microseconds after the main trigger radiofrequency pulse going to the generator 10.

The time between successive echoes gives the velocity if the length of the ultrasonic-wave path in the sound medium is known. The attenuation is determined by introducing an auxiliary radiofrequency pulse from another pulse generator called the comparator oscillator 28 operated at the same frequency as the generator 10. The variable delayed trigger from oscilloscope 24 which operates the comparator oscillator 28 makes it possible to delay this pulse in relation to the radiofrequency pulse from the generator 10 and so place the comparator pulse near the echo to be measured. The relative amplitude of each echo is determined by matching the pulse from comparator oscillator 28 to it by inserting attenuation by means of a calibrated attenuator 30 and recording its readings. These readings give the relative amplitude of the reflected pulses in decibels.

Further details of apparatus suitable for generating ultrasonic pulse vibrations and measuring their attenuation and velocity changes in a medium are to be found in the Journal of Applied Physics, vol. 23, p. 267 et seq.

Figure 2:
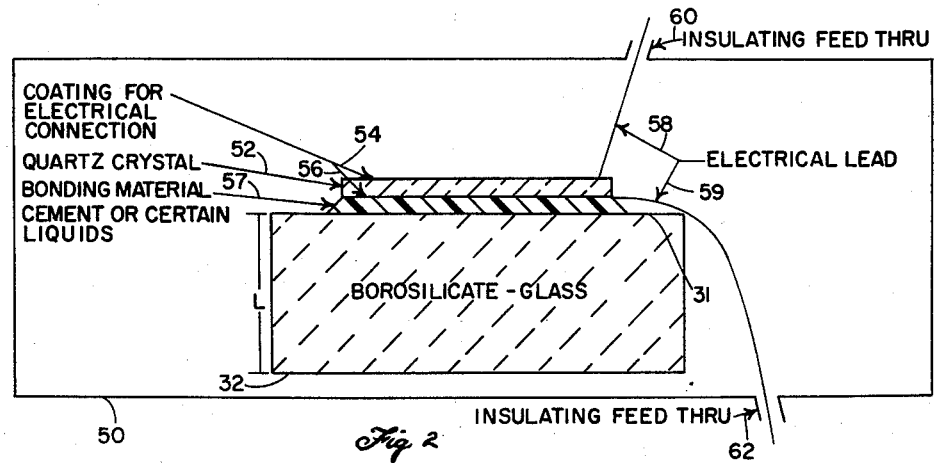
Figure 2 is a sectional view illustrating a borosilicate-glass neutron-responsive medium ultrasonically coupled to a piezo-electric quartz crystal and housed within an aluminum case.

The transducer 14 and neutron-responsive medium 16 shown generally in Figure 1 are shown in greater detail in Figure 2 together with an aluminum case 50 therefor. A cylindrical borosilicate-glass neutron-responsive medium 16 is held within aluminum case 50 in a manner not shown but, for example, as by imbedding it in glass wool. Its dimensions are selected so that ultrasonic reflections from the sides do not interfere with the main echoes from the ends 31 and 32. Transducer 14 comprises a cylindrical piezo-electric quartz crystal 52 with conductive coatings 54 and 56 on its upper and lower face, respectively.

Figure 3:
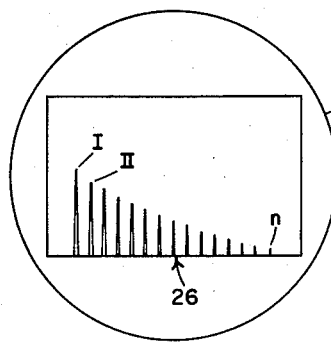
Figure 3 shows an oscilloscope pattern representative of ultrasonic-wave echo pulses which are established in the neutron responsive medium.

Reference is now to Figure 3 which shows a typical oscilloscope pattern during an ultrasonic transmission characteristic measurement. The oscilloscope screen 70 contains pattern 26. First, the pulse generator 10 is tuned to the resonant frequency or its harmonic of the quartz crystal 52. The vertical trace heights I, II, ... n are representative of the magnitudes of the successive ultrasonic wave echo pulses respectively, which cause the transducer 14 to send electrical pulses to receiver 20. To determine the ultrasonic velocity, the time difference between the first echo I and the last echo n is measured and divided by the number of echoes. This time measurement must be made with an electronic device or other suitable means of sufficient precision. From this and the length L of the neutron-responsive medium 16, the velocity at any given time is determined. The following technique is followed for determining the ultrasonic-wave attenuation characteristic of medium 16 at any given time. In addition to the vertical trace pattern 26 on oscilloscope 24, there is present thereon, as result of the comparator oscillator 28, another trace pattern. By altering the setting of calibrated attenuator 30, the envelope resulting from comparator oscillator 28 is made to coincide with the envelope of the vertical trace pattern 26. The setting of calibrated attenuator box 30, which causes the aforesaid envelopes to coincide, is a measure of the ultrasonic-wave attenuation characteristic of medium 16.

Figure 4:
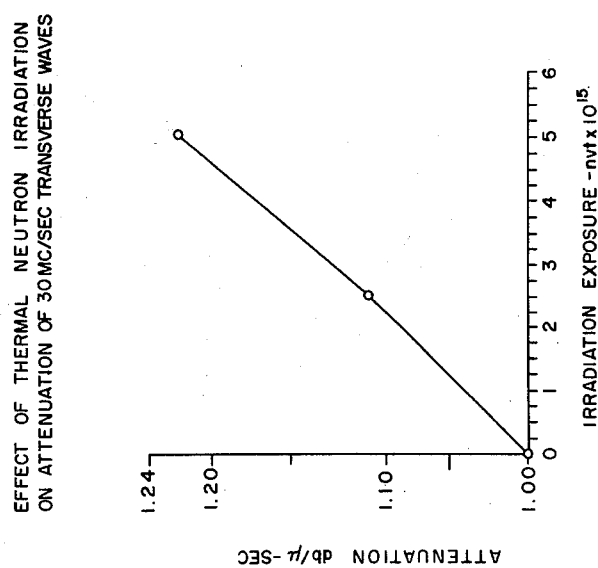
Figure 4 is an illustrative curve for calibration purpose showing the relationship between thermal neutron irradiation of a borosilicate-glass medium and ultrasonic-wave velocity for 10 megacycles per second transverse waves therein.

Figure 4 is an illustrative curve for calibration purposes useful in the practice of this invention. It shows the relationship between thermal neutron irradiation of a borosilicate-glass neutron-responsive medium and ultrasonic-wave attenuation therein for 30 megacycles per second transverse ultrasonic waves.

Figure 5:
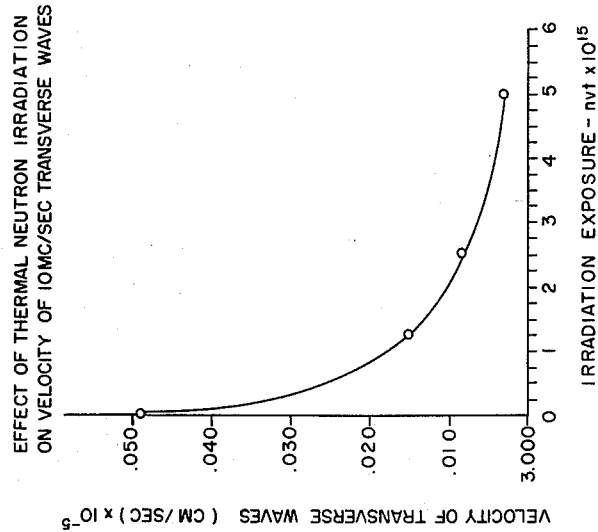
Figure 5 is an illustrative curve for calibration purpose showing the relationship between thermal neutron irradiation of a borosilicate-glass neutron-responsive medium and ultrasonic wave attenuation therein for 30 megacycles per second transverse ultrasonic waves therein.

Figure 5 is an illustrative curve for calibration purposes useful in the practice of this invention. It shows the relationship between thermal neutron irradiation of a borosilicate-glass neutron-responsive medium and ultrasonic wave velocity therein for 30 megacycles per second transverse ultrasonic waves.

The curves of Figures 4 and 5 were obtained by procedures outlined in detail below.

For the velocity curve of Figure 5, glass samples containing 28% by weight of $B_2O_3$ and hence about 1.5% of $_5B^{10}$ which has a large cross section for the thermal neutron reaction $B^{10}(n,\alpha)Li^7$, were prepared as rectangular plates having closely parallel faces and dimensions of 33 x 36 x 9.4 mm. and were each exposed to irradiation at an ambient temperature of 50° C. in a nuclear reactor at a point where the thermal neutron flux was about $5 \times 10^{15}$ nvt per hour. Each of the several separate exposure samples was irradiated in an approximately identical position in the reactor for a predetermined time interval after which each sample was removed from the flux field and permitted to "cool" for about 24 hours to eliminate radiation from short-lived isotopes prior to making physical measurements. The ultrasonic neutron dosimetry electrical system and the techniques aforesaid were utilized for the calibration measurements. In making the measurements, a quartz transducer was cemented to one face of the glass plate and a 10 megacycle per second vibrational pulse of about one microsecond duration was generated by the transducer which, because of the bonding of transducer to the glass surface, caused a 10 megacycle per second wave to pass through the glass sample, rebound from the surface oppositely disposed to the surface to which the transducer was affixed, and return through the solid to the surface to which the transducer was attached. The transducer was then used as a detector to pick up the pulse. After initiation of a vibrational pulse, the waves generated rebounded from the oppositely disposed surfaces of the glass plate and remained in the plate until the vibrational energy was dissipated after repeated passage through the solid. At each return of the wave to the transducer surface, the transducer was operated as a detector and generated an electrical signal which was used after proper electronic amplification to present a display on an oscilloscope, from which the time interval between successive returns of the transverse wave to the source surface was determined by electronic methods aforesaid. The measured time interval between successive pulses was used to compute the velocity of the transverse waves through the glass.

Glass samples identical to those used for the calibration curve of Figure 4 were prepared for the calibration curve of Figure 5 and were exposed to neutron irradiation under identical conditions and allowed to "cool" for 24 hours and provided with a quartz transducer on one surface. A 30 megacycle per second vibrational pulse of about one microsecond duration was generated by the transducer, after which the transducer was operated as a detector to pick up the return wave pulses after each cycle in the glass plate. The electrical output signal was used to present a display on an oscilloscope from which the attenuation was readily determined by electronic methods aforesaid.

This invention is useful in monitoring and controlling all neutron emitting nuclear reactions and is particularly advantageous for application with the class of transportable nuclear reactors in which nuclear fission provides the energy which ultimately permits integral movement of the nuclear reactor and its supporting and containing structure. Examples are nuclear-powered ships and submarine boats, nuclear-powered railroad locomotives, and nuclear-powered aircraft and rockets. The delays in readout inherent in the measurement of neutron flux using test media which must be removed from the reactor cannot be tolerated. An instantaneous remote reading method for the indication and recording of neutron flux, as provided by this invention, is required because of the need for constant surveillance of the nuclear reactor and because the requirement for transportability necessitates, at least in air or spacecraft, lightweight shielding and the isolation and distant separation of the nuclear reactor instrumentation which is under surveillance of human beings. It is apparent that any method to be satisfactory for such surface must use working elements which can remain inside the nuclear reactor for extended periods of time without suffering degradation which would obviate their usefulness.

Although the foregoing disclosure has been concerned with the measurement of thermal neutron flux through use of sensitive elements which exhibit thermal neutron capture followed by fission without the generation of additional neutrons or other nuclides capable of initiating further fission, it will be obvious to one skilled in the art that the principles and methods herein disclosed can be used with equal utility for the measurement of fluxes of fast neutrons, protons, and possibly energetic gamma rays, or the like, if there is provided a judiciously selected sensitive medium having a chemical composition which will generate recoil particles which are capable of causing lattice distortion, which lattice distortion causes mechanical changes that can be measured by ultrasonic means according to the teachings of this invention.

Also, in the measurement of fluxes of alpha particles and the like, it is not necessary to incorporate chemical elements capable of fission in the sensitive element since the passage of the alpha particles into and through the solid sensitive element is sufficient to cause lattice distortion which can be measured by the means herein disclosed.

The scope of this invention is in no way limited to the subject matter herein disclosed but is only limited as will be made apparent by the appended claims.

We claim:

1. Apparatus for remotely and continuously measuring neutron-dose in a neutron flux environment comprising, in combination, a block of neutron responsive ultrasonic-wave transmitting substance whose transmission characteristic changes with irradiation, said block being remotely located in a neutron flux environment, transducer means ultrasonically coupled to said block for converting received electrical pulses into ultrasonic-wave pulses through said block and reconverting the echoes thereof into imparted electrical pulses, means for transmitting spaced electrical pulses to said transducer, means for receiving spaced electrical pulses from said transducer and means for indicating said changed transmission characteristic representative of said neutron-dose.

2. The apparatus of claim 1 wherein the irradiation is thermal neutron flux.

3. Apparatus for remotely and continuously measuring neutron-dose in a neutron-flux environment comprising, in combination, a block of neutron-responsive ultrasonic-wave transmitting substance whose attenuation thereof changes with neutron-dose received, said block being remotely located in a neutron flux environment, transducer means ultrasonically coupled to said block for converting received electrical pulses into ultrasonic-wave pulses through said block and reconverting the echoes thereof into imparted electrical pulses, means for transmitting spaced electrical pulses to said transducer means, oscillator means for establishing a separate train of spaced electrical pulses, means causing the attenuation of said latter pulses, and means for comparing the electrical pulses from said transducer with those from said oscillator means for continuously indicating said neutron dose received by said block.

4. The apparatus of claim 3 wherein the neutron-responsive substance contains $_5B^{10}$.

5. The apparatus of claim 3 wherein the block of neutron-responsive substance is borosilicate-glass.

6. The apparatus of claim 3 wherein the attenuation of the sensitive substance increases with irradiation.

7. The apparatus of claim 3 wherein the neutron-responsive substance contains $_3Li^7$.

8. The apparatus of claim 2 wherein the transducer is a piezo-electric quartz crystal.

9. Apparatus for ultrasonic neutron dosimetry comprising, in combination, means for generating radiofrequency electrical pulses, means remotely connected electrically thereto for generating ultrasonic-wave pulses, said means including a transducer, a neutron-responsive substance, said transducer being ultrasonically coupled to said neutron-responsive substance wherein said generated ultrasonic-wave pulses are established, a neutron flux environment, said neutron-responsive medium being located in said environment, receiving means electrically coupled to said transducer for receiving therefrom radiofrequency electrical pulses generated thereby as result of ultrasonic-wave echo pulses in said medium and means connected to said receiving means for indicating the velocity change of said ultrasonic-wave pulses in said neutron-responsive substance representative of the neutron-dose received by said medium.

10. The apparatus of claim 9 wherein the neutron-responsive substance contains $_5B^{10}$.

11. The apparatus of claim 9 wherein the block of neutron-responsive substance is borosilicate-glass.

12. The apparatus of claim 9 wherein the attenuation of the sensitive substance increases with irradiation.

13. The apparatus of claim 9 wherein the neutron-responsive substance contains $_3Li^7$.

14. The apparatus of claim 9 wherein the transducer is a piezo-electric quartz crystal.

15. Apparatus for ultrasonic neutron dosimetry comprising, in combination, electrical means for generating and receiving radiofrequency electrical pulses, said means including a pulsed generator providing a first train of electrical pulses, an oscilloscope connected to said pulsed generator, a switching circuit connected between said oscilloscope and said pulsed generator for intermittently triggering it, a radiofrequency electrical pulse receiver connected to said oscilloscope, a comparator oscillator providing a second train of electrical pulses delayed triggered by said oscilloscope via said switching circuit, a calibrated attenuator connected between said comparator oscillator and said receiver, a thermal neutron-flux environment, a piezo-electric transducer remotely coupled electrically to said electrical means, a neutron-responsive medium in said neutron flux environment ultrasonically coupled to said transducer, whereby first electrical pulses transmitted by said pulsed generator to said transducer cause it to establish ultrasonic-wave pulses in said medium, echo ultrasonic waves in said medium causing said transducer to transmit a third train of electrical pulses to said receiver, said switching circuit causing said pulsed generator and comparator oscillator to provide said first train and second train of electrical pulses coordinately and said attenuator causing said oscilloscope to display an indication of said neutron-dose.

References Cited in the file of this patent

"Variation of Elastic Wave Velocity With Frequency in Fused Quartz and Armco Iron," by Hughes et al., Journal of Applied Physics, vol. 26, No. 11, November 1955, pages 1307 to 1309.

"A Sonic Technique for Testing Leather," N.B.S. Technical News Bulletin, vol. 40, No. 3, March 1956, pages 35 to 37.